Aug. 1, 1933.  D. A. SILLERS  1,920,437
SEPARATING DEVICE
Filed April 11, 1930
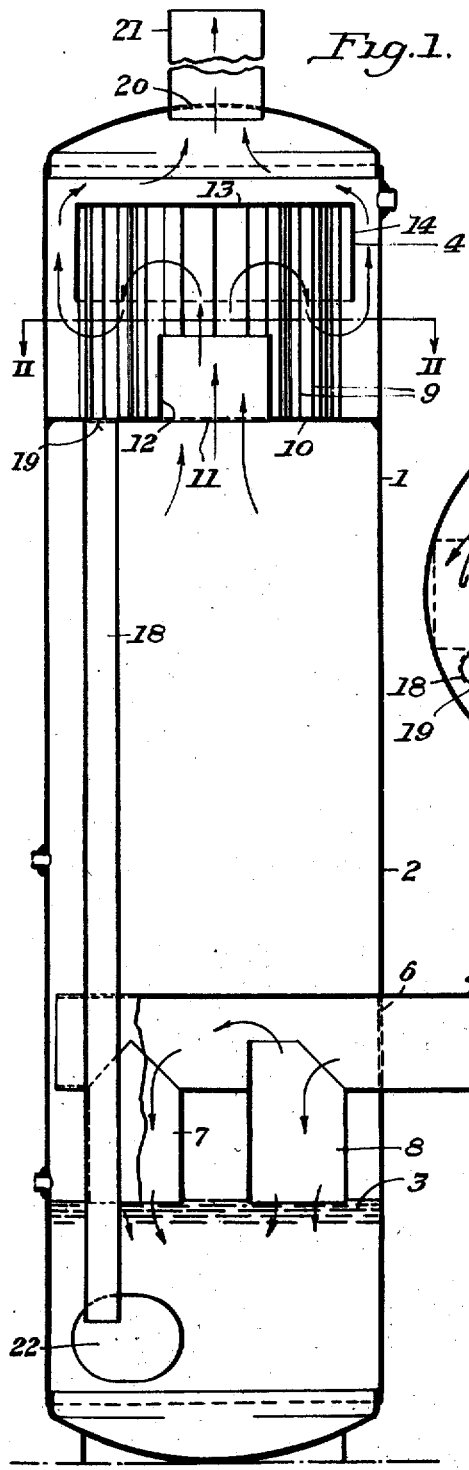
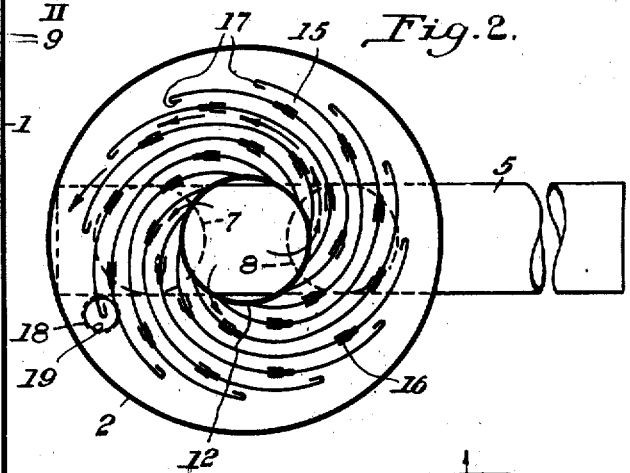
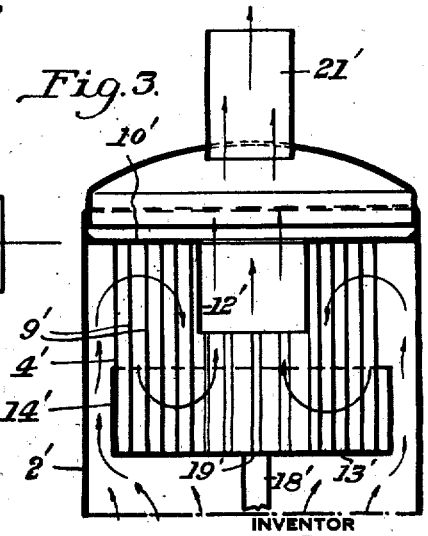
INVENTOR
Donald A Sillers
by
Byrnes, Stebbins, Parmelee & Blenko
his Attorneys Patented Aug. 1, 1933

1,920,437

UNITED STATES PATENT OFFICE 1,920,437

SEPARATING DEVICE

Donald A. Sillers, Dallas, Tex.

Application April 11, 1930. Serial No. 443,409

5 Claims. (Cl. 183—91)

My invention relates to a method of and means for separating the liquid from a gas which contains the liquid as a mist.

My improved separator is applicable to separators where the liquid is first separated from the gas by centrifugal force and then later the liquid mist is separated from the gas, and also to gas cleaners where foreign matter such as dust and dirt is separated from the gas by first bringing it in contact with a cleaning liquid which extracts the dust particles and then separating out the cleaning liquid picked up as a mist from the cleaning liquid by the gas.

I provide a separating device comprising a plurality of passageways having transverse pockets on the inner and outer walls thereof that are adapted to aid in extracting liquid from the gas as it flows through the passageways.

I further provide a separating device having means associated therewith for preventing the mist from which the liquid is to be extracted from coming in contact with the top of the separating device. This novel means not only precludes the possibility of the separated liquid from being thrown into the liquid-free gas stream, but it also imparts to the mist as it goes through the passageways a downwardly extending component which assists the natural flow of the extracted liquid downwardly in the transverse pockets.

Preferred forms of my construction are illustrated in the accompanying drawing, in which, Fig. 1 is a vertical sectional view of a gas cleaner having my improved separating device associated therewith;

Fig. 2 is a cross sectional view of the gas cleaner taken on the line II—II of Fig. 1; and Fig. 3 is a vertical sectional view similar to Fig. 1 of a gas cleaner showing another modification of the mist extracting device.

Referring to the drawing, the gas cleaner 1 comprises a vertical cylindrical tank 2 having a certain amount of cleaning liquid 3 in the lower part thereof, and a mist extracting device 4 in the upper part thereof. A horizontal gas inlet conduit 5 extends through an opening 6 provided in the side of the tank 2. A plurality of vertical nozzles 7 and 8 are provided in the conduit 5 which depend downwardly onto the surface of the cleaning liquid 3.

The mist extracting device 4 in the upper part of the container 2 consists of a plurality of spiral partitions 9 mounted upon a horizontal partition plate 10. The partition 10 is provided with a circular opening 11 which is continued upwardly by a short conduit 12 mounted on the partition 10. The spiral plates 9 are covered by a cap 13 having an outer wall 14 extending part way down the outside of the spiral plates 9.

The spiral plates 9 are spaced relatively to each other to form spiral nozzles 15 through which the gas is caused to flow at a high velocity. Spaced transverse vertical extending pocket-forming projections 16 are mounted on the inner and outer walls of the spiral partition plates 9. The ends 17 of the partition plates 9 are also bent over to form vertical pockets.

The downwardly extending wall 14 of the cap 13 is provided for the purpose of keeping the mist-laden gas from impinging against the undersurface of the upper plate 13 and depositing liquid on it where the liquid is forced out into the gas stream again. The gas as it flows in the spiral passageways tends to take the shortest possible path between the inlet and outlet openings and in case the downwardly extending wall 14 was omitted the gas would flow into the inlets of the nozzles and taking an upwardly extending component through the nozzles would finally impinge against the surface of the upper plate 13 where the undesirable deposition of the extracted liquid back into the gas stream would take place.

The downwardly extending outer wall 14 not only prevents the gas stream from coming in contact with the upper plate 13, but it even by coaction with the upwardly extending inner conduit 12 causes the gas to take a path which has a downwardly extending component. This causes the natural tendency of the extracted liquid flowing downwardly in the pockets to be assisted. The extracted liquid flows from the pockets on to the top of the partition 10, from which it is discharged into the bottom of the container 2 by a vertical conduit 18, communicating with an opening 19 in the partition 10.

The gas is discharged from the container through an opening 20 in the top thereof. The discharged gas may be conducted to a pipe line or gas tank through a conduit 21 associated with the top of the tank 2 at the opening 20.

The cleaning liquid 3 may be withdrawn or renewed through an outlet 22 provided in the lower part of the container 2.

In operation, dust-laden gas is conducted through the conduit 5 and impinges upon the surface of the cleaning liquid 3 which is preferably oil. This causes the heavy dust particles to be collected by the cleaning liquid and the gas rises within the container 2 with an entrained oil mist. This gas is directed up through the opening 11 in the partition 10 and passes through the mist extracting device 4. In the mist extracting device the gas is blocked away from the top plate 13 and passes through the nozzles 15 in a slightly downwardly extending path due to the relative positions of the inner wall 12 and the outer wall 14.

The mist is extracted from the gas as it passes through the spiral passageways by a three-fold action of the transverse vertical pockets:

First, as mentioned above, the gas tends to take the shortest possible path between the inlet and outlet openings of the passageways. This action causes a portion of the gas to wipe against the convex surface of the inner wall of the passageways. Heretofore, it has been thought that the gas was thrown by centrifugal force against the concave wall of the passageway, but in my device pockets are placed on the convex wall in addition to those placed on the concave wall for collecting liquid carried by the gas which tends to take the short-circuited path through the passageway.

Secondly, liquid is extracted from the gas by the action of centrifugal force, a certain amount of the gas being thrown out against the concave wall of the passageway. The vertical pockets assist in collecting liquid from the gas which is acted upon by centrifugal force.

Thirdly, a portion of the gas in passing between the vanes 9 is alternately wiped against one vane and then the other due to the presence of the staggered pockets 16. The pockets are positioned on both the concave and the convex walls of the passageway and tend to deflect a portion of the gas against the opposite wall or vane of the passageway, thereby inducing a turbulence in the gas which eventually causes all of the gas to come in contact with at least a portion of the surface of the passageway. Most of the liquid is separated by the action of the mist being wiped across the surfaces of the passageways. The pockets set up a turbulent motion in the gas which assists in exposing the gas to the surface of the passageway, and also the pockets carry off the oil which has collected on the surfaces of the passageways.

These three actions of the gas in passing through the passageways all tend to cause the gas to impinge upon the surfaces of the passageways where it is relieved of any mist because the latter is converted into liquid, and carried downward out of the path of the gas stream by the pockets.

Referring to Figure 3, the mist extracting device 4' is shown upside-down with respect to the mist extracting device 4 shown in Figure 1. In this case, the partition plate 10' is at the top of the device and the cap 13' is at the bottom of the device. The operation of the mist extractor 4' is otherwise similar to that described above, in connection with Figures 1 and 2. It is to be noted that in the mist extracting device 4', the gas passes from the circumference of the device toward the center, thence upwardly and out of the gas conduit 21'.

The outer sleeve 14' controls the elevation at which the incoming mist enters the mist extracting unit 4' at the bottom and around the circumference and the inner sleeve 12' controls the elevation at which the gas approaches the outlet, causing the gas to be deflected away from the top plate and to take a path between the vanes 9' having a downwardly extending component.

A highly desirable feature of my invention resides in the cooperation of the inner wall 12 and the outer wall 14 of the mist extracting device in causing the gas to take the most efficient path through the extractor. As mentioned above, I have found that gas tends to take the shortest path between two points regardless of the positions of baffles and the like which are intended to influence the direction of its flow. By referring to Figure 1 it will be observed that the inner wall 12 is elevated sufficiently high and the outer wall 14 is extended sufficiently low so that the gas flowing through the extractor will tend to take a path through the middle portion of the passageways. In other words, the gas in passing through the extractor is kept away from both the lower partition 10 and the upper plate 13 by the inner wall 12 and the outer wall 14 respectively. This arrangement provides a highly satisfactory and efficient method of and means for separating the mist from the mist-laden gas.

As mentioned above, while I prefer to use oil as a cleaning liquid, water or other similar liquid can be used, since the operation of the apparatus depends upon the greater affinity between the dust and the liquid than between the dust and the gas. The apparatus will thus separate dust, oil, water and other material heavier than the gas being cleaned, and having a greater affinity for the cleaning fluid than for the gas.

While I have illustrated and described the preferred form of my invention, it will be understood that it is not thus limited, but may be otherwise embodied within the scope of the following claims.

I claim:

1. A mist extracting device comprising a plurality of spaced spiral vanes arranged to form a horizontal ring, a bottom member for said ring having a horizontal portion covering the bottom sides of the vanes and a cylindrical wall extending part way up the inner opening of the ring, a top cap for the ring having a cylindrical wall extending part way down the outer periphery of the ring, said spiral vanes having vertically extending pockets facing into the path of the mist, and means whereby gas is introduced into and discharged from the extractor, the offset inner and outer cylindrical walls causing the gas to flow through the openings between the vanes in a downwardly direction, thereby assisting the naturally downwardly flowing liquid collected by the pockets.

2. A mist extracting device comprising a plurality of spaced spiral vanes arranged to form a horizontal ring, a bottom member for said ring having a horizontal portion covering the bottom sides of the vanes and a vertically extending portion extending part way up the inner opening of the ring, a top cap for the ring having a vertically extending wall extending part way down the outer periphery of the ring, said spiral vanes having pockets facing into the path of the mist, and means whereby gas may be introduced into the extractor through the inner opening of the ring and discharged from the extractor through the openings between the vanes, said vertically extending inner and outer walls causing the gas to flow through the openings between the vanes in a downwardly direction.

3. A mist extracting device comprising a plurality of spaced spiral vanes arranged to form a horizontal ring, a bottom member for said ring having a horizontal portion covering the bottom sides of the vanes and a vertically extending wall extending part way up the outer periphery of the ring, a top cap for the ring having a vertically extending wall extending part way down the inner opening of the ring, said spiral vanes having pockets facing into the path of the mist, and means whereby gas is introduced into the extractor through the openings between the vanes and discharged from the extractor through the opening of the ring, said vertically extending walls causing the gas to flow through the openings between the vanes in a downwardly extending direction.

4. A mist extracting device comprising a plurality of spaced spiral vanes arranged to form a horizontal ring, a bottom member for said ring having a horizontal portion covering the bottom sides of the vanes and a vertically extending wall extending part way up the ring, a top cap for the ring having a horizontal portion covering the upper sides of the vanes and a vertically extending wall extending part way down the ring, said spiral vanes having pockets facing into the path of the mist, and means whereby gas may be introduced into and discharged from the extractor, said vertically extending walls causing the gas to flow through the openings between the vanes in a downwardly extending direction.

5. A mist extracting device comprising a plurality of spaced spiral vanes arranged to form a ring, said spiral vanes having pockets facing into the path of the mist, spaced plates for covering the ends of said ring, one of said plates having a wall extending around the outer periphery of said ring, and the other of said plates having an opening therein corresponding with the inner opening of said ring and a wall extending around said inner opening, both of said walls extending toward the opposite plate, and means whereby gas may be introduced into and discharged from the extractor, said inner and outer walls causing the gas to flow through the openings between the vanes in a direction at an angle to said spaced end plates.

DONALD A. SILLERS.

CERTIFICATE OF CORRECTION.

Patent No. 1,920,437.     August 1, 1933.

DONALD A. SILLERS.

It is hereby certified that error appears in the printed specification of the above numbered patent requiring correction as follows: Page 3, line 4, claim 3, after "the" second occurrence, insert the word "inner"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.

pockets facing into the path of the mist, and means whereby gas is introduced into the extractor through the openings between the vanes and discharged from the extractor through the opening of the ring, said vertically extending walls causing the gas to flow through the openings between the vanes in a downwardly extending direction.

4. A mist extracting device comprising a plurality of spaced spiral vanes arranged to form a horizontal ring, a bottom member for said ring having a horizontal portion covering the bottom sides of the vanes and a vertically extending wall extending part way up the ring, a top cap for the ring having a horizontal portion covering the upper sides of the vanes and a vertically extending wall extending part way down the ring, said spiral vanes having pockets facing into the path of the mist, and means whereby gas may be introduced into and discharged from the extractor, said vertically extending walls causing the gas to flow through the openings between the vanes in a downwardly extending direction.

5. A mist extracting device comprising a plurality of spaced spiral vanes arranged to form a ring, said spiral vanes having pockets facing into the path of the mist, spaced plates for covering the ends of said ring, one of said plates having a wall extending around the outer periphery of said ring, and the other of said plates having an opening therein corresponding with the inner opening of said ring and a wall extending around said inner opening, both of said walls extending toward the opposite plate, and means whereby gas may be introduced into and discharged from the extractor, said inner and outer walls causing the gas to flow through the openings between the vanes in a direction at an angle to said spaced end plates.

DONALD A. SILLERS.

CERTIFICATE OF CORRECTION.

Patent No. 1,920,437.　　　　　　　　　　　　　　　　August 1, 1933.

DONALD A. SILLERS.

It is hereby certified that error appears in the printed specification of the above numbered patent requiring correction as follows: Page 3, line 4, claim 3, after "the" second occurrence, insert the word "inner"; and that the said Letters Patent should be read with this correction therein that the same may conform to the record of the case in the Patent Office.

Signed and sealed this 22nd day of August, A. D. 1933.

(Seal)　　　　　　　　　　　　　　　　　　　M. J. Moore.
　　　　　　　　　　　　　　　　　　　Acting Commissioner of Patents.

CERTIFICATE OF CORRECTION.

Patent No. 1,920,437.  August 1, 1933.

DONALD A. SILLERS.

It is hereby certified that error appears in the printed specification of the above numbered patent requiring correction as follows: Page 3, line 4, claim 3, after "the" second occurrence, insert the word "inner"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.